US012657192B2

(12) United States Patent
Wang et al.

(10) Patent No.: US 12,657,192 B2
(45) Date of Patent: Jun. 16, 2026

(54) METHOD AND APPARATUS FOR DISPLAYING SEARCH RESULT, AND COMPUTER STORAGE MEDIUM

(71) Applicant: BEIJING BYTEDANCE NETWORK TECHNOLOGY CO., LTD., Beijing (CN)

(72) Inventors: Zhongchao Wang, Beijing (CN); Chao Qiao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 55 days.

(21) Appl. No.: 18/008,105

(22) PCT Filed: Jul. 29, 2021

(86) PCT No.: PCT/CN2021/109325
§ 371 (c)(1),
(2) Date: Dec. 2, 2022

(87) PCT Pub. No.: WO2022/048360
PCT Pub. Date: Mar. 10, 2022

(65) Prior Publication Data
US 2023/0315736 A1     Oct. 5, 2023

(30) Foreign Application Priority Data

Sep. 4, 2020    (CN) .......................... 202010922887.5

(51) Int. Cl.
| | |
|---|---|
| *G06F 16/2455* | (2019.01) |
| *G06F 16/248* | (2019.01) |
| *G06F 16/28* | (2019.01) |

(52) U.S. Cl.
CPC ...... *G06F 16/24556* (2019.01); *G06F 16/248* (2019.01); *G06F 16/288* (2019.01)

(58) Field of Classification Search
None
See application file for complete search history.

(56) References Cited

U.S. PATENT DOCUMENTS

| | | | | |
|---|---|---|---|---|
| 10,394,408 B1 * | 8/2019 | Freund | ................... | H04N 21/00 |
| 11,488,042 B1 * | 11/2022 | Chapman | ................. | G06N 7/01 |

(Continued)

FOREIGN PATENT DOCUMENTS

| | | |
|---|---|---|
| CN | 101398832 A | 4/2009 |
| CN | 103914543 A | 7/2014 |

(Continued)

OTHER PUBLICATIONS

Weikang et al., "Video retrieval method and device", 2020 (Year: 2020).*

(Continued)

*Primary Examiner* — Dawaune A Conyers
(74) *Attorney, Agent, or Firm* — BakerHostetler

(57) ABSTRACT

A method and apparatus for displaying search results, and a computer storage medium. The method comprises: sending a search request in response to a search triggering instruction; obtaining a multi-entity aggregation result corresponding to the search request; and displaying the multi-entity aggregation result. A multi-entity aggregation result corresponding to the search request can be obtained. The multi-entity aggregation result comprises entity information of multiple target entities. The entity information of the multiple target entities is obtained on the basis of associated media content corresponding to the search request. Accordingly, the user terminal can intuitively display to a user the entity information of the multiple target entities that match the search request, and the user can conveniently view the entity information of the target entity in which the user is (Continued)

interested, thereby reducing time costs incurred in performing searching by the user, and improving search efficiency.

17 Claims, 10 Drawing Sheets

(56) References Cited

U.S. PATENT DOCUMENTS

| | | | | |
|---|---|---|---|---|
| 2013/0007618 A1* | 1/2013 | Dodson | | H04N 21/41265 |
| | | | | 715/716 |
| 2014/0188927 A1 | 7/2014 | Moxley et al. | | |
| 2015/0121242 A1* | 4/2015 | Kwon | | G06F 16/48 |
| | | | | 715/739 |
| 2018/0246898 A1* | 8/2018 | White | | G06Q 30/0631 |
| 2019/0340255 A1* | 11/2019 | Huyghe | | G06F 40/284 |
| 2020/0057823 A1* | 2/2020 | McCarty | | G06F 16/9535 |
| 2021/0383121 A1* | 12/2021 | Liu | | G06V 10/764 |

FOREIGN PATENT DOCUMENTS

| | | | |
|---|---|---|---|
| CN | 104462506 A | 3/2015 | |
| CN | 105786836 A | 7/2016 | |
| CN | 106649737 A | 5/2017 | |
| CN | 112084268 A | 12/2020 | |
| CN | 112084268 B | 5/2022 | |

OTHER PUBLICATIONS

International Patent Application No. PCT/CN2021/109325; Int'l Search Report; dated Nov. 3, 2021; 3 pages.

First Office Action for Chinese Application No. 202010921860.4, mailed Jan. 30, 2022, 22 pages.

International Preliminary Report on Patentability for International Application No. PCT/CN2021/109325, mailed Mar. 16, 2023, 13 pages.

Rejection Decision for Chinese Application No. 202010921860.4, mailed Jul. 26, 2022, 22 pages.

Second Office Action for Chinese Application No. 202010921860.4, mailed Apr. 22, 2022, 20 pages.

Written Opinion for International Application No. PCT/CN2021/109325, mailed Nov. 3, 2021, 9 Pages.

\* cited by examiner

Receive a search request — S801

Obtain an associated media content matched with the search request — S802

Determine entity information of a plurality of target entities according the associated media content — S803

Generate a multi-entity aggregation result corresponding to the search request based on the entity information of the plurality of target entities — S804

900

1000

METHOD AND APPARATUS FOR DISPLAYING SEARCH RESULT, AND COMPUTER STORAGE MEDIUM

CROSS REFERENCE TO RELATED APPLICATIONS

The present application is the U.S. National Stage of International Application No. PCT/CN2021/109325, titled "METHOD AND APPARATUS FOR DISPLAYING SEARCH RESULT, AND COMPUTER STORAGE MEDIUM", filed on Jul. 29, 2021, which claims the priority to the Chinese Patent Application No. 202010922887.5, field on Sep. 4, 2020, and entitled "METHOD AND APPARATUS FOR DISPLAYING SEARCH RESULT, AND COMPUTER STORAGE MEDIUM", the entire contents of both of which are incorporated herein by reference.

FIELD

The present disclosure relates to the technical field of Internet, in particular to a search result displaying method and apparatus, and a computer storage medium.

BACKGROUND

With the continuous development of Internet technology, searching information through terminal applications or websites has become the main source of information for people. After initiating a search request on the terminal applications or websites, a user will get a list of search results. If the user wants to find a media content that is interested in in the list of the search results, the user needs to consult each search result in the list of the search results one by one, resulting in high search time cost and low search efficiency of the user.

SUMMARY embodiments of the present disclosure at least provide a search result displaying method and apparatus, and a computer storage medium.

In a first aspect, an embodiment of the present disclosure provides a search result displaying method, comprising:

sending a search request in response to a search triggering instruction, and the search request corresponding to a plurality of entities;

obtaining a multi-entity aggregation result corresponding to the search request, wherein the multi-entity aggregation result comprises entity information of a plurality of target entities matched with the search request, and the entity information is obtained based on an associated media content corresponding to the search request; and displaying the multi-entity aggregation result.

In a possible implementation, the entity information comprises identification information of the target entities and target content information associated with the target entities;

wherein the target content information associated with the target entities contains: at least one associated media content corresponding to the target entities among a plurality of associated media contents corresponding to the search request.

In a possible implementation, displaying the multi-entity aggregation result, comprises:

displaying the identification information of the plurality of target entities in a first displaying region;

determining a target recommended entity corresponding to selected target identification information among the identification information of the plurality of target entities; and displaying content information associated with the target recommended entity in other displaying regions.

In a possible implementation, displaying the identification information of the plurality of target entities in the first displaying region, comprises:

displaying the identification information of the plurality of target entities sequentially in the first displaying region according to the obtained identification information of the plurality of target entities.

In a possible implementation, displaying the multi-entity aggregation result, comprises:

displaying the at least one associated media content corresponding to the target recommended entity sequentially in a second displaying region.

In a possible implementation, determining the target recommended entity corresponding to the selected target identification information among the identification information of the plurality of target entities, comprises:

taking a target entity displayed in a first displaying position of the first displaying region as an initial target recommended entity after obtaining the multi-entity aggregation result; and if a selection operation for identification information of other target entities displayed in other displaying positions of the first displaying region is detected, taking the other target entities as updated target recommended entities.

In a possible implementation, the target content information associated with the target entities further contains: encyclopedic knowledge information and/or recommendation information of the target entities.

In a possible implementation, displaying the multi-entity aggregation result, comprises:

displaying the encyclopedic knowledge information and/or the recommendation information of a target recommended entity in a third displaying region.

In a possible implementation, the target content information associated with the target entities further contains: function entry information of a target recommended entity, and the function entry information is used for triggering to display a consumption page corresponding to the target recommended entity.

In a possible implementation, displaying the multi-entity aggregation result, comprises:

displaying the function entry information of the target recommended entity in a fourth displaying region; and displaying the consumption page corresponding to the target recommended entity after detecting a trigger operation for the function entry information.

In a possible implementation, displaying the function entry information of the target recommended entity in the fourth displaying region, comprises:

in a case that an entity category of the target recommended entity belongs to a target entity category, displaying the function entry information of the target recommended entity in the fourth displaying region.

In a second aspect, an embodiment of the present disclosure further provides a search result displaying method, comprising:

receiving a search request, and the search request corresponding to a plurality of entities;

obtaining an associated media content matched with the search request;

determining entity information of a plurality of target entities according to the associated media content; and generating a multi-entity aggregation result corresponding to the search request based on the entity information of the plurality of target entities.

In a possible implementation, the entity information comprises identification information of the target entities and target content information associated with the target entities;

wherein the target content information associated with the target entities contains: at least one associated media content corresponding to the target entities among a plurality of associated media contents corresponding to the search request.

In a possible implementation, the method further comprising:

performing entity extraction on a plurality of media contents in advance to obtain identification information of a plurality of extracted core entities, and storing a corresponding relation between identification information of each media content and the identification information of the extracted core entities;

determining the entity information of the target entities according to the associated media content, comprises:

determining the entity information of the target entities according to the identification information of the associated media content and the stored corresponding relation.

In a possible implementation, determining the entity information of the target entities according to the identification information of the associated media content and the stored corresponding relation, comprises:

searching identification information of a core entity corresponding to the associated media content according to the identification information of the associated media content and the stored corresponding relation;

determining attribute information of the searched core entity based on knowledge map information corresponding to the identification information of the core entity and the associated media content; and selecting identification information of the target entities from the identification information of the searched core entity based on intention classification information corresponding to the search request and the attribute information of the core entity.

In a possible implementation, determining the attribute information of the searched core entity based on the knowledge map information corresponding to the identification information of the core entity and the associated media content, comprises:

searching classification information corresponding to the identification information of the core entity from a knowledge map;

taking the classification information, attribute features of the associated media content corresponding to the core entity and the number of occurrences of the core entity in different associated media contents as attribute information of the core entity;

wherein the attribute features of the associated media content comprise: at least one of attribute information of an author, a relevancy between the associated media content and the search request and a sort order of the associated media content in this search.

In a possible implementation, performing entity extraction on the plurality of media contents in advance to obtain the identification information of the plurality of extracted core entities, comprises:

performing entity extraction on the plurality of media contents based on a pre-trained entity extraction model to obtain the identification information of the plurality of extracted core entities, and the entity extraction model being obtained by training a media content sample based on manually labeled identification information of the core entities.

In a possible implementation, if the search request is an attribute-type search request, which refers to a search request that uses a plurality of attribute keywords to represent a search intention, obtaining the associated media content matched with the search request, comprises:

obtaining a knowledge map-type content matched with the attribute keywords in the search request; and determining the identification information of the target entities and the content information associated with the target entities according to the associated media content, comprises:

extracting the identification information of the target entities and the content information associated with the target entities used for being displayed in the multi-entity aggregation result from the knowledge map-type content matched with the attribute keywords in the search request.

In a possible implementation, the target content information associated with the target entities further comprises: an encyclopedic knowledge content and/or recommendation information; and the encyclopedic knowledge content and/or the recommendation information are determined according to the following steps:

obtaining the encyclopedic knowledge content matched with the identification information of the target entities based on the identification information of the target entities; and/or determining the recommendation information corresponding to the target entities based on user behavior data and/or author attribute information of each associated media content corresponding to the target entities.

In a third aspect, an embodiment of the present disclosure further provides a search result displaying apparatus, comprising:

a sending module configured to send a search request in response to a search triggering instruction, and the search request corresponding to a plurality of entities;

a first obtaining module configured to obtain a multi-entity aggregation result corresponding to the search request, wherein the multi-entity aggregation result comprises entity information of a plurality of target entities matched with the search request, and the entity information is obtained based on an associated media content corresponding to the search request; and a displaying module configured to display the multi-entity aggregation result.

In a possible implementation, the entity information comprises identification information of the target entities and target content information associated with the target entities;

wherein the target content information associated with the target entities contains: at least one associated media content corresponding to the target entities among a plurality of associated media contents corresponding to the search request.

In a possible implementation, the displaying module is further configured to: display the identification information of the plurality of target entities in a first displaying region;

determine a target recommended entity corresponding to selected target identification information among the identification information of the plurality of target entities; and display content information associated with the target recommended entity in other displaying regions.

In a possible implementation, the displaying module is further configured to display the identification information of the plurality of target entities sequentially in the first displaying region according to the obtained identification information of the plurality of target entities.

In a possible implementation, the displaying module is further configured to display the at least one associated media content corresponding to the target recommended entity sequentially in a second displaying region.

In a possible implementation, the displaying module is further configured to take a target entity displayed in a first displaying position of the first displaying region as an initial target recommended entity after obtaining the multi-entity aggregation result; and if a selection operation for identification information of other target entities displayed in other displaying positions of the first displaying region is detected, take the other target entities as updated target recommended entities.

In a possible implementation, the target content information associated with the target entities further contains: encyclopedic knowledge information and/or recommendation information of the target entities.

In a possible implementation, the displaying module is further configured to display the encyclopedic knowledge information and/or the recommendation information of a target recommended entity in a third displaying region.

In a possible implementation, the target content information associated with the target entities further contains: function entry information of a target recommended entity, and the function entry information is used for triggering to display a consumption page corresponding to the target recommended entity.

In a possible implementation, the displaying module is further configured to display the function entry information of the target recommended entity in a fourth displaying region; and display the consumption page corresponding to the target recommended entity after detecting a trigger operation for the function entry information.

In a possible implementation, the displaying module is further configured to: in a case that an entity category of the target recommended entity belongs to a target entity category, display the function entry information of the target recommended entity in the fourth displaying region.

In a fourth aspect, an embodiment of the present disclosure further provides a search result displaying apparatus, comprising:

a receiving module configured to receive a search request, and the search request corresponding to a plurality of entities;

a second obtaining module configured to obtain an associated media content matched with the search request;

a determining module configured to determine entity information of a plurality of target entities according to the associated media content; and a generating module configured to generate a multi-entity aggregation result corresponding to the search request based on the entity information of the plurality of target entities.

In a possible implementation, the entity information comprises identification information of the target entities and target content information associated with the target entities; wherein the target content information associated with the target entities contains: at least one associated media content corresponding to the target entities among a plurality of associated media contents corresponding to the search request.

In a possible implementation, the apparatus further comprising: entity extraction module configured to perform entity extraction on a plurality of media contents in advance to obtain identification information of a plurality of extracted core entities, and storing a corresponding relation between identification information of each media content and the identification information of the extracted core entities;

the determining module is further configured to determine the entity information of the target entities according to the identification information of the associated media content and the stored corresponding relation.

In a possible implementation, the determining module is further configured to search identification information of a core entity corresponding to the associated media content according to the identification information of the associated media content and the stored corresponding relation; determine attribute information of the searched core entity based on knowledge map information corresponding to the identification information of the core entity and the associated media content; and select identification information of the target entities from the identification information of the searched core entity based on intention classification information corresponding to the search request and the attribute information of the core entity.

In a possible implementation, the determining module is further configured to search classification information corresponding to the identification information of the core entity from a knowledge map; take the classification information, attribute features of the associated media content corresponding to the core entity and the number of occurrences of the core entity in different associated media contents as attribute information of the core entity; wherein the attribute features of the associated media content comprise: at least one of attribute information of an author, a relevancy between the associated media content and the search request and a sort order of the associated media content in this search.

In a possible implementation, the entity extraction module is further configured to perform entity extraction on the plurality of media contents based on a pre-trained entity extraction model to obtain the identification information of the plurality of extracted core entities, and the entity extraction model being obtained by training a media content sample based on manually labeled identification information of the core entities.

In a possible implementation, if the search request is an attribute-type search request, which refers to a search request that uses a plurality of attribute keywords to represent a search intention, the second obtaining module configured to obtain a knowledge map-type content matched with the attribute keywords in the search request; and the determining module is further configured to extract the identification information of the target entities and the content information associated with the target entities used for being displayed in the multi-entity aggregation result from the knowledge map-type content matched with the attribute keywords in the search request.

In a possible implementation, the target content information associated with the target entities further comprises: an encyclopedic knowledge content and/or recommendation information; and the apparatus further comprises a target content information determining module configured to obtain the encyclopedic knowledge content matched with the identification information of the target entities based on the identification information of the target entities; and/or determine the recommendation information corresponding to the target entities based on user behavior data and/or author attribute information of each associated media content corresponding to the target entities.

In a fifth aspect, an embodiment of the present disclosure further provides a computer device, including: a processor, a memory and a bus. The memory stores machine-readable instructions that can be executed by the processor, when the computer device is running, the processor is in communication with the memory through the bus, and the machine-readable instructions, when executed by the processor, execute steps in a first aspect or any possible implementation in the first aspect, or execute steps in a second aspect or any possible implementation in the second aspect.

In a sixth aspect, an embodiment of the present disclosure further provides a computer-readable storage medium, storing computer programs. The computer programs, when run by a processor, execute steps in the first aspect or any possible implementation in the first aspect, or steps in the second aspect or any possible implementation in the second aspect.

According to the search result displaying method and apparatus and the computer storage medium provided by the embodiments of the present disclosure, when a user initiates a search request at a user side, a multi-entity aggregation result corresponding to the search request can be obtained, and the multi-entity aggregation result contains entity information of a plurality of target entities matched with the search request. The user side can intuitively display the entity information of the plurality of target entities matched with the search request to the user, the user can intuitively see the plurality of target entities through the aggregation result, so that the user can conveniently filter the target entities of interest, the efficiency of information search is improved, and search time is saved.

For the effect description of the search result displaying apparatus, an electronic device and a computer-readable storage medium, refer to the description of the search result displaying method, which will not be repeated here.

In order to make above objectives, features and advantages of the present disclosure more obvious and understandable, the following is a detailed description of preferred embodiments in combination with the accompanying drawings.

BRIEF DESCRIPTION OF THE DRAWINGS

In order to more clearly explain the technical solution of the embodiments of the present disclosure, the drawings needed to be used in the embodiments will be briefly introduced below. The drawings here are incorporated into the specification and form a part of the specification. These drawings show embodiments in accordance with the disclosure, and are used together with the specification to explain the technical solution of the disclosure. It should be understood that the following drawings only show some embodiments of the present disclosure, so they should not be regarded as limiting the scope. For those skilled in the art, other relevant drawings can be obtained from these drawings without any creative effort.

DETAILED DESCRIPTION OF THE EMBODIMENTS

Figure 1:
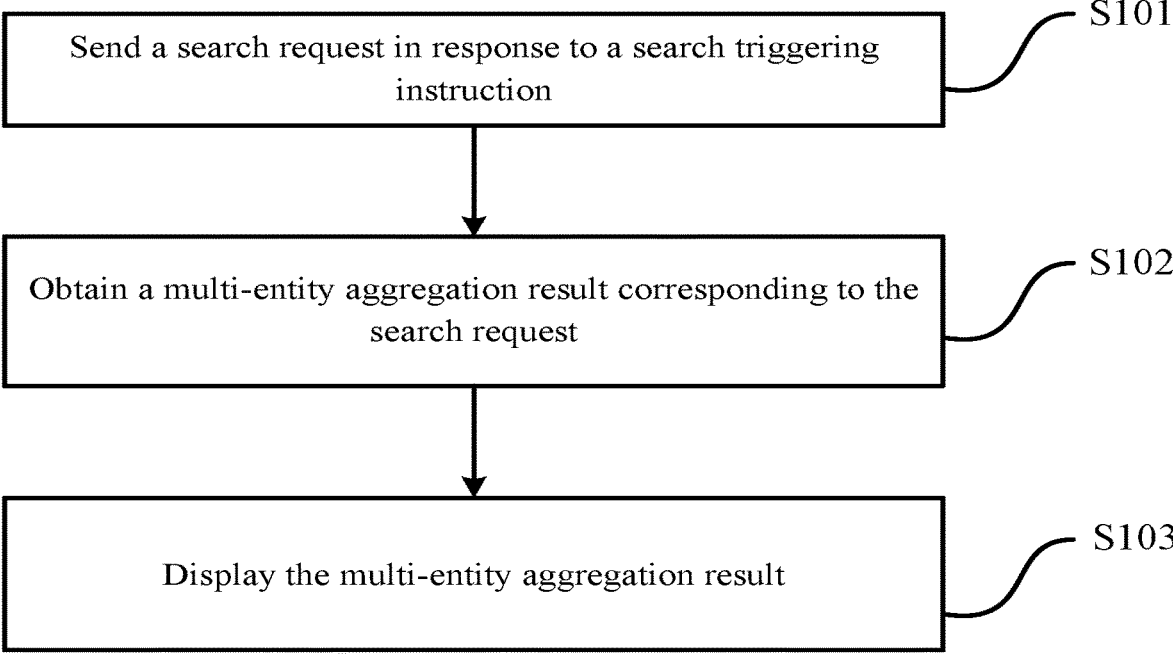
FIG. 1 shows a flow chart of a search result displaying method provided by an embodiment of the present disclosure.

In order to make the purposes, technical solutions and advantages of the embodiments of the present disclosure more clear, the technical solutions in the embodiments of the present disclosure will be described clearly and completely below in combination with the drawings in the embodiments of the present disclosure. Obviously, the described embodiments are only part of the embodiments of the present disclosure, not all of them. The components of embodiments of the present disclosure, which are generally described and shown in the accompanying drawings herein, may be arranged and designed in various different configurations. Therefore, the following detailed description of the embodiments of the present disclosure provided in the drawings is not intended to limit the scope of the disclosure, but merely represents selected embodiments of the disclosure. Based on the embodiments of the present disclosure, all other embodiments obtained by those skilled in the art without doing creative work belong to the scope of protection of the present disclosure.

It is found through research that when a user searches for a media content interest on terminal applications or websites, the user can only view a list of search results consisting of a plurality of search results on a terminal screen. Each search result contains: a title of a search result webpage, a brief introduction to the search result, etc. The user needs to consult in the search list one by one to find the search results that meet his/her own search needs, resulting in high search time cost and low search efficiency of the user.

Based on the above research, the embodiments of the present disclosure provide a search result displaying method and apparatus and a computer storage medium, when the user initiates a search request at a user side, a server may aggregate entity information of a plurality of target entities that meet the search request of the user to generate a multi-entity aggregation result, and send the multi-entity aggregation result to the user side, and the user side displays the above multi-entity aggregation result. In this way, the user can see a plurality of target entities at once through the multi-entity aggregation result, so that the user can conveniently and quickly locate the target entities of interest, the efficiency of information search is improved, and search time is saved. In addition, in the embodiment of the present disclosure, the multi-entity aggregation result may contain identification information of each target entity and target content information associated with each target entity, the user side may display identification information of a plurality of recommended entities matched with the search request, the user may select a target recommended entity that is interested in, and based on the interested target recommended entity that the user has selected, content information associated with the target recommended entity may be displayed in a current page, so that the user can conveniently and quickly view relevant information of the target entity that is interested in.

The defects in the above solutions are all the results of practice and careful study of an inventor, therefore, the discovery process of the above problems and the solutions proposed by the present disclosure below for the above problems should be the inventor's contribution to the present disclosure in the process of the present disclosure.

It should be noted that similar numerals and letters represent similar items in the following accompanying drawings. Therefore, once an item is defined in an accompanying drawing, it does not need to be further defined and explained in subsequent accompanying drawings.

In order to facilitate the understanding of the embodiment, firstly, a search result displaying method disclosed in an embodiment of the present disclosure is introduced in detail. An executive body of the search result displaying method provided by the embodiment of the present disclosure is generally a computer device with certain computing power. The computer device includes, for example, a terminal device, a server or other processing devices, the terminal device may be user equipment (UE), a mobile device, a user terminal, a terminal, a cellular phone, a cordless phone, a personal digital assistant (PDA), a handheld device, a computing device, a vehicle-mounted device, a wearable device, etc. In some possible implementations, the search result displaying method may be implemented by a processor calling computer-readable instructions stored in a memory.

Embodiment 1

Taking an executive body being a user side as an example, the following describes a search result displaying method provided by an embodiment of the present disclosure.

Here, the user side may be a terminal device, a tablet computer, a computer device and other electronic devices with a display function. The terminal device may be user equipment (UE), a mobile device, a user terminal, a terminal, a cordless phone, a personal digital assistant (PDA), a handheld device, a computing device, a vehicle-mounted device, etc.

Referring to FIG. 1, which is a flow chart of a search result displaying method provided by an embodiment of the present disclosure, the method includes steps S101-S103:

S101, a search request is sent in response to a search triggering instruction.

The search triggering instruction may be initiated by a user clicking a search button on a search page.

Here, the search request carries a search content input by the user, which may represent a search intention of the user. The search request processed in the embodiment of the present disclosure involves a plurality of entities, for example, the user searches for "movies suitable for lovers to view", and this search request corresponds to a plurality of movie entities.

In a specific implementation, the user inputs the search content on the search page of the user side and clicks the "Search" button, and then the user side may send the search request of the user to a server.

In a specific implementation, after the user side sends the search request of the user to the server, the server may obtain an associated media content matched with the search request, determine entity information of a plurality of target entities according the associated media content, generate a multi-entity aggregation result corresponding to the search request based on the entity information of the plurality of target entities, and return the multi-entity aggregation result to the user side. See the description of embodiments of a server side for details.

S102, the multi-entity aggregation result corresponding to the search request is obtained.

As previously mentioned, the multi-entity aggregation result obtained by the user side includes the entity information of the plurality of target entities matched with the search request, and the entity information is obtained based on the associated media content corresponding to the search request.

Here, the entity information may include identification information of the target entities and target content information associated with the target entities.

The identification information of the target entities may include an entity identification number, an entity name and a thumbnail representing the target entities, and may further include a label of an order bit of the target entity among the plurality of target entities contained in the multi-entity aggregation result. The thumbnail of the entities may be a publicity picture, an introduction picture and the like.

the target content information associated with the target entities may include: at least one associated media content corresponding to the target entities among a plurality of associated media contents corresponding to the search request, that is, in the embodiment of the present disclosure, the identification information of the plurality of target entities may be displayed, at the same time, the associated media content corresponding to the search request of the user may further be displayed synchronously.

In addition, the target content information associated with the target entities may further include: encyclopedic knowledge information and/or recommended information of the target entities, and/or function entry information corresponding to the target entities. Here, the recommended information may be a text introduction content, a graphic introduction content, a video or audio introduction content, etc. of the target entity. The function entry information may be used for indicating the user to click to enter a details page of the target entity, and the details page may be a specific displaying interface of the target entity, and may also be a purchase page corresponding to the target entity.

In a specific implementation, according to different entity categories, the above encyclopedic knowledge information and/or recommended information, and/or the above function entry information may be selectively displayed. An entity category includes, for example, film and television, commodity, popular science, music, menu, etc. For example, the encyclopedic knowledge information and/or recommended information may not be displayed for menu, and the encyclopedic knowledge information and/or recommended information is displayed for film and television and popular science. For another example, the function entry information may be displayed for the entity categories of film and television, commodity and music.

S103, the multi-entity aggregation result is displayed.

In a specific implementation, after the multi-entity aggregation result is received based on step S102, the identification information of the plurality of target entities may be sequentially displayed according to the obtained identification information of the plurality of target entities in the multi-entity aggregation result.

Here, the identification information may include an entity name, a thumbnail representing the entities and an order bit of each entity in the multi-entity aggregation result.

Figure 2:
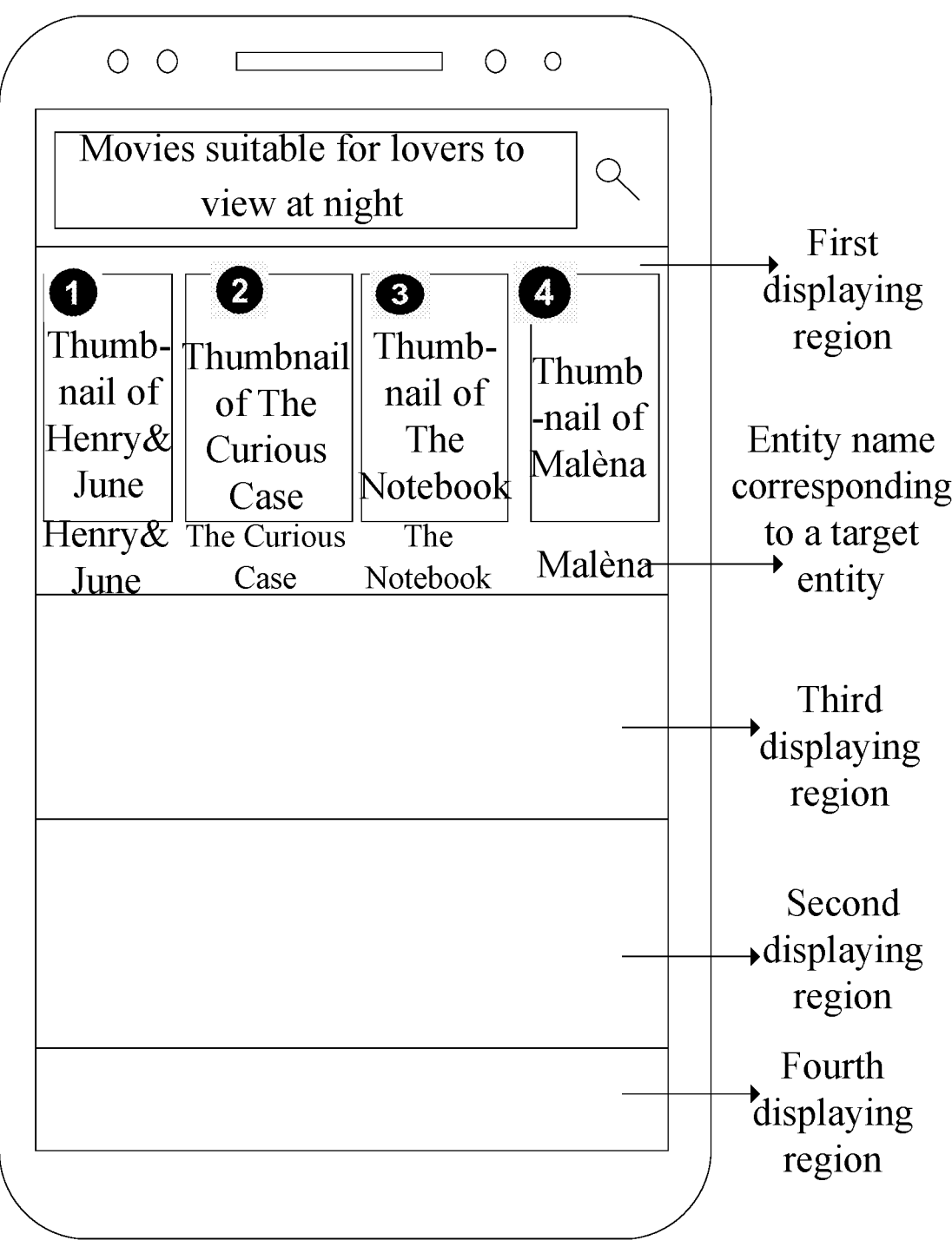
FIG. 2 shows a schematic diagram of a displaying interface of a first displaying region provided by an embodiment of the present disclosure.

For example, after the user inputs the search content as "movies suitable for lovers to view at night" on a screen of the user side, the multi-entity aggregation result received by the user side involves a plurality of target entities of film and television works, such as "Henry&June", "The Curious Case of Benjamin Button", "The Notebook" and "Malena". According to the order bit of the plurality of target entities, the user side displays the name and thumbnail of "Henry&June", the name and thumbnail of "The Curious Case of Benjamin Button", the name and thumbnail of "The Notebook" and the name and thumbnail of "Malena" sequentially in a first displaying region. In addition, labels of the order bit of "Henry&June", "The Curious Case of Benjamin Button", "The Notebook" and "Malena" may further be displayed. For a displaying page of the first displaying region, specifically taking the user side being a mobile phone as an example, as shown in FIG. 2.

In a specific implementation, after the identification information of the plurality of target entities is displayed in the first displaying region of the user side, a target recommended entity corresponding to selected target identification information among the identification information of the plurality of target entities is determined, and content information associated with the target recommended entity is displayed in other displaying regions.

Here, on the one hand, considering the limited screen displaying space, and on the other hand, in order to facilitate the user to focus on the target entity that is interested in, in the embodiment of the present disclosure, the user may locate quickly the target recommended entity of interest among the plurality of target entities displayed in the first displaying region, after the user side confirms the target recommended entity that the user is interested in, the content information associated with the target recommended entity selected by the user may be displayed in other displaying regions.

In addition, after obtaining the multi-entity aggregation result, when the user has not selected the target entity of interest among the identification information of the plurality of target entities displayed in the first displaying region, a target entity displayed in a first displaying position of the first displaying region may be taken as a default initial target recommended entity. After a selection operation for identification information of other target entities displayed in other displaying positions of first displaying region is detected by the user side, the other target entities are taken as updated target recommended entities.

That is, when the target recommended entity is the target entity arranged in the first displaying position among the plurality of target entities, the content information associated with the target recommended entity arranged in the first displaying position is displayed in other displaying regions. After the selection operation for the identification information of other target entities displayed in other displaying positions of first displaying region is detected by the user side, the other target entities are taken as the updated target recommended entities, and content information associated with the updated target recommended entities is displayed in other displaying regions.

The content information associated with the target recommended entities may include at least one associated media content corresponding to the target recommended entity, the encyclopedic knowledge information and/or recommended information of the target recommended entity, and the function entry information corresponding to the target entity. The recommended information may include text introduction, graphic introduction, video or audio introduction of the target recommended entity, and the encyclopedic knowledge information is an encyclopedic knowledge content for introducing the target recommended entity.

Specifically, the at least one associated media content corresponding to the target recommended entity may be displayed in a second displaying region according to the order of the at least one associated media content corresponding to the target recommended entity. Furthermore, the encyclopedic knowledge information and/or the recommendation information of the target recommended entity may be displayed in a third displaying region. In addition, when the target recommended entity is a target entity of film and television, commodity or music category, the content information associated with the target recommended entity further contains function entry information, and the function entry information of the target recommended entity may be displayed in a fourth displaying region.

Specifically, a process for the user side to display the multi-entity aggregation result is as follows: the entity name of each target entity and the thumbnail corresponding to each target entity contained in the multi-entity aggregation result are displayed in the first displaying region according to the order of each target entity, at the same time, the target entity displayed in the first displaying position of the first displaying region is taken as the initial target recommended entity, and target content information associated with the initial target recommended entity is displayed in other displaying regions. After detecting that the user selects other target entities, the target entity selected by the user is taken as a new target recommended entity, and target content information associated with the new target recommended entity is displayed in other displaying regions. Specifically, according to the order of a plurality of associated media contents corresponding to the target recommended entity and a size of a screen of the user side, at least one associated media content corresponding to the target recommended entity in the front of the arrangement is displayed in the second displaying region; encyclopedic knowledge information and/or recommended information of the target recommended entity is displayed in the third displaying region; and in a case that the entity category of the target recommended entity belongs to a target entity category, function entry information of the target recommended entity is displayed in the fourth displaying region. Here, as an implementation, when the target recommended entity does not belong to the target entity category, the content information associated with the target recommended entity may not contain the function entry information, that is, the fourth displaying region may not be required.

Figure 3:
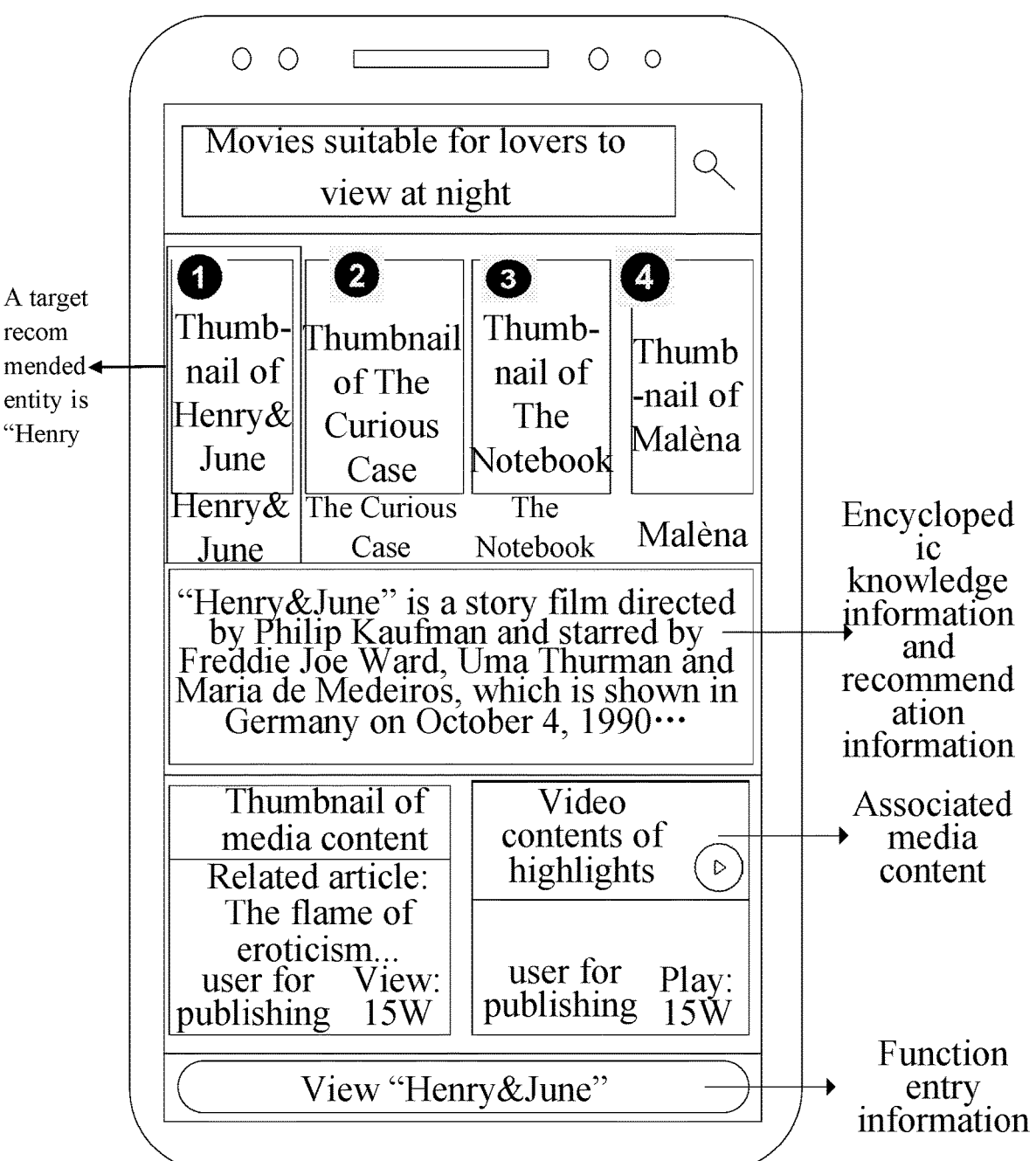
FIG. 3 shows a schematic diagram of a search result provided by an embodiment of the present disclosure.

Exemplarily, when the user inputs the search content as "movies suitable for lovers to view at night" on the screen of the user side, the server determines that a plurality of target entities that meet the search request of the user are film and television works: "Henry&June", "The Curious Case of Benjamin Button", "The Notebook" and "Malena" according to the search request of the user, in addition, the entity categories corresponding to the plurality of target entities belong to the above target entity category, the server generates the multi-entity aggregation result based on the plurality of target entities and returns the multi-entity aggregation result to the user side, and the user side displays the entity name, entity thumbnail and labels of order bit of "Henry&June", "The Curious Case of Benjamin Button", "The Notebook" and "Malena" sequentially in the first displaying region based on the identification information of the plurality of target entities in the multi-entity aggregation result. When the user does not select the identification information of any target entity among the plurality of target entities displayed in the first displaying region, "Henry&June" is taken as the default initial target recommended entity, and the associated media contents, such as an article introduction content, a film and television comment content and a highlight content, related to "Henry&June" are displayed in the second displaying region; a film and television brief introduction content corresponding to "Henry&June" and indication information "View encyclopedic information" indicating the user to view the encyclopedic knowledge of the film and television work (here, after the user clicks "View encyclopedic information", it may jump to an encyclopedic knowledge details page corresponding to the film and television work) are displayed in the third displaying region; and the function entry information (here, the function entry information may be: view "Henry&June") indicating the user to operate is displayed in the fourth displaying region. A displaying interface of search results specifically takes the user side being the mobile phone as an example, as shown in FIG. 3.

Figure 4:
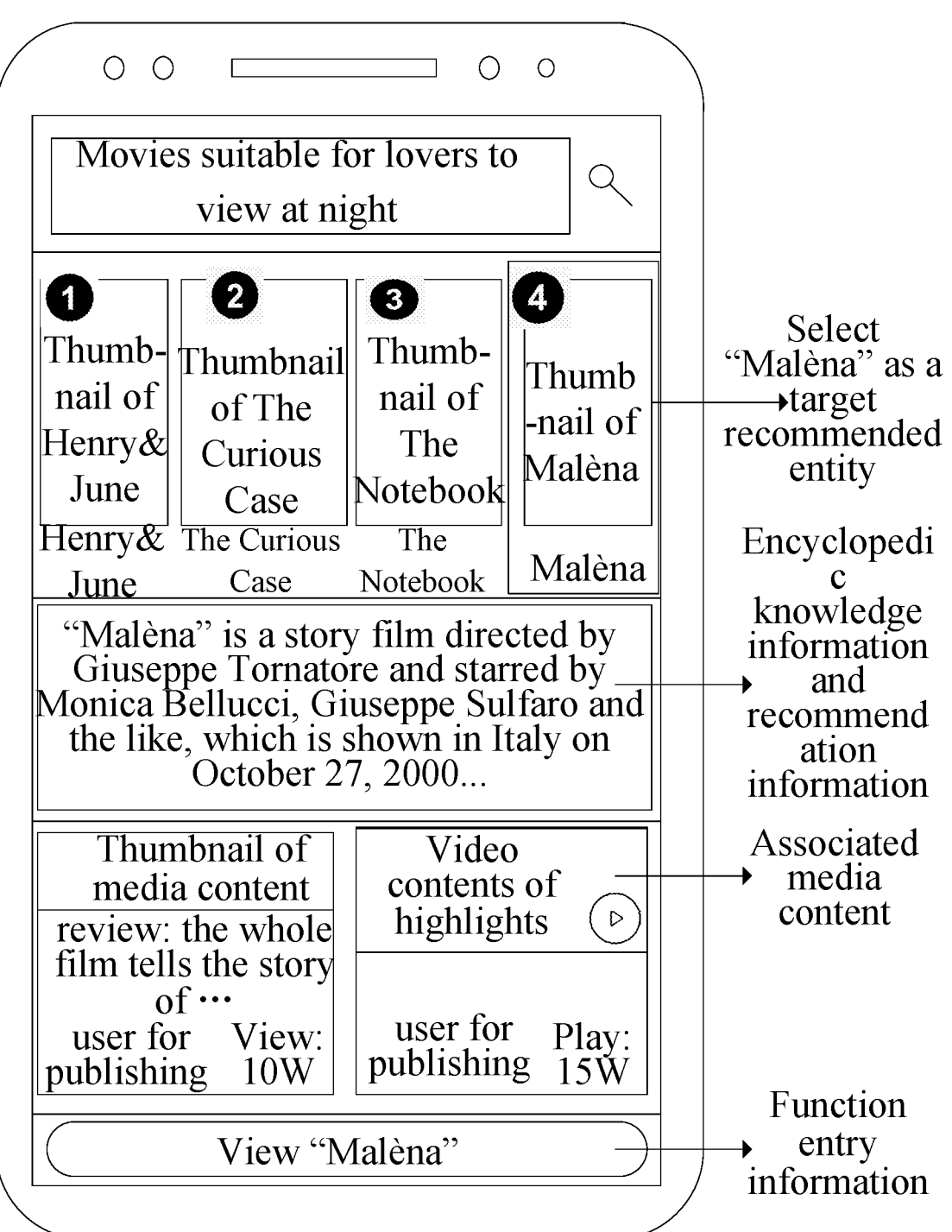
FIG. 4 shows a schematic diagram of a displaying interface of another search result provided by an embodiment of the present disclosure.

Exemplarily, when the user inputs the search content as "movies suitable for lovers to view at night" on the screen of the user side, the server determines that a plurality of target entities that meet the search request of the user are film and television works: "Henry&June", "The Curious Case of Benjamin Button", "The Notebook" and "Malena" according to the search request of the user, in addition, the entity categories corresponding to the plurality of target entities belong to the target entity category, the server generates the multi-entity aggregation result based on the plurality of target entities and returns the multi-entity aggregation result to the user side, and the user side displays the entity name, entity thumbnail and order bit of "Henry&June", "The Curious Case of Benjamin Button", "The Notebook" and "Malena" sequentially in the first displaying region based on the identification information of the plurality of target entities in the multi-entity aggregation result. When the user selects the identification information of "Malena" among the plurality of target entities displayed in the first displaying region, "Malena" is taken as the target recommended entity, and the associated media contents, such as an article introduction content, a film and television comment content and a highlight content, related to "Malena" are displayed in the second displaying region; a film and television brief introduction content corresponding to "Malena" and indication information "View encyclopedic information" indicating the user to view the encyclopedic knowledge of the film and television work (here, after the user clicks "View encyclopedic information", it may jump to an encyclopedic knowledge details page corresponding to the film and television work) are displayed in the third displaying region; and the function entry information (here, the function entry information may be: view "Malena") indicating the user to operate is displayed in the fourth displaying region. A displaying interface of search results specifically takes the user side being the mobile phone as an example, as shown in FIG. 4.

According to the search result displaying method provided by the embodiment of the present disclosure, when the user initiates the search request at the user side, the multi-entity aggregation result corresponding to the search request can be obtained, and the multi-entity aggregation result contains the entity information of the plurality of target entities matched with the search request. The user side can intuitively display the entity information of the plurality of target entities matched with the search request to the user, the user can intuitively see the plurality of target entities through the aggregation result, so that the user can conveniently filter the target entities of interest, the efficiency of information search is improved, and the search time is saved.

In an optional implementation, after the at least one associated media content corresponding to the target recommended entity is displayed in the second displaying region, the method further includes: a details page of any associated media content is displayed in response to the selection operation for any associated media content.

Specifically, after the user selects the associated media content of the target recommended entity displayed on the screen, it jumps to the details page of the associated media content, and the details page of the associated media content is displayed on the screen of the user side.

Figure 5:
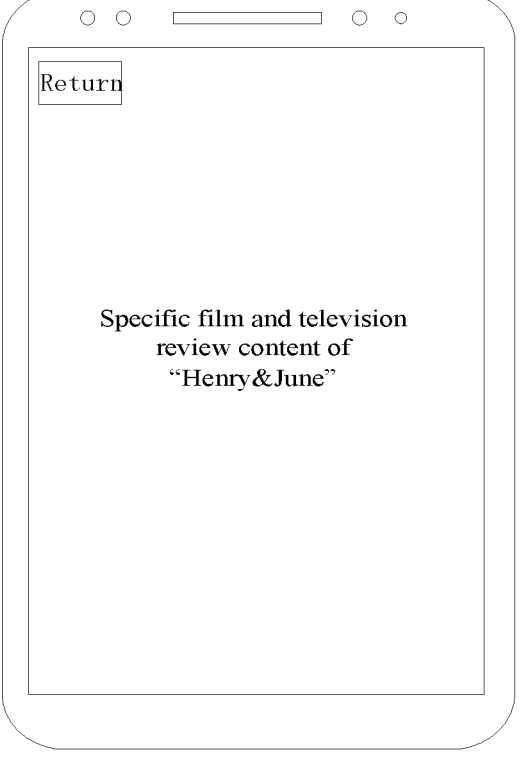
FIG. 5 shows a schematic diagram of a displaying interface of a detail page of an associated media content provided by an embodiment of the present disclosure.

Exemplarily, when the user inputs the search content as "movies suitable for lovers to view at night" on the screen of the user side and initiates the search request, the user side receives the multi-entity aggregation result and displays the entity name, entity thumbnail and labels of order bit of "Henry&June", "The Curious Case of Benjamin Button", "The Notebook" and "Malena" sequentially in the first displaying region based on the identification information of the plurality of target entities in the multi-entity aggregation result. "Henry&June" is taken as the target recommended entity by default, the associated media contents, such as an article introduction content, a film and television comment content and a highlight content, related to "Henry&June" are displayed in the second displaying region, the encyclopedic knowledge information corresponding to "Henry&June" is displayed in the third displaying region, and the function entry information indicating the user to operate is displayed in the fourth displaying region. After the user selects the film and television comment content from the film and television comment content and the highlight content of "Henry&June" in the second displaying region, the details page of the film and television comment content is displayed on the screen of the user side. The details page specifically may be an interface display diagram shown in FIG. 5, taking the user side being the mobile phone as an example.

In an optional implementation, after the function entry information of the target recommended entity is displayed in the fourth displaying region, the method further includes: after detecting a trigger operation for the function entry information, a consumption page corresponding to the target recommended entity is displayed in response to the trigger operation for the function entry information.

The trigger operation may be selection operations such as a double-click operation and a single-click operation.

The consumption page may be a play or purchase page, and may also be a specific details page playing or displaying the recommended entity.

Specifically, after the user selects the function entry information of the target recommended entity displayed on the screen, it jumps to a consumption page of the associated media content, and the consumption page corresponding to the target recommended entity is displayed on the screen of the user side.

Figure 6:
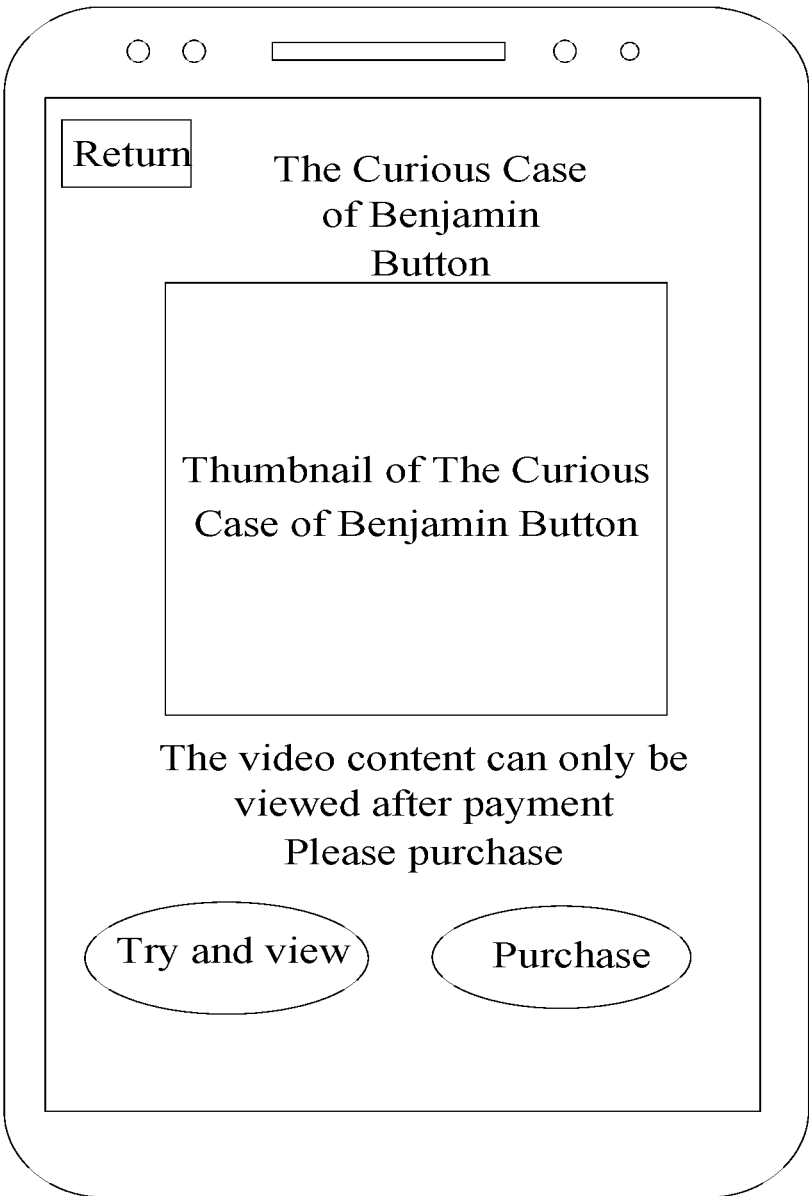
FIG. 6 shows a schematic diagram of a displaying interface of a consumption page corresponding to a target recommended entity provided by an embodiment of the present disclosure.
Figure 7:
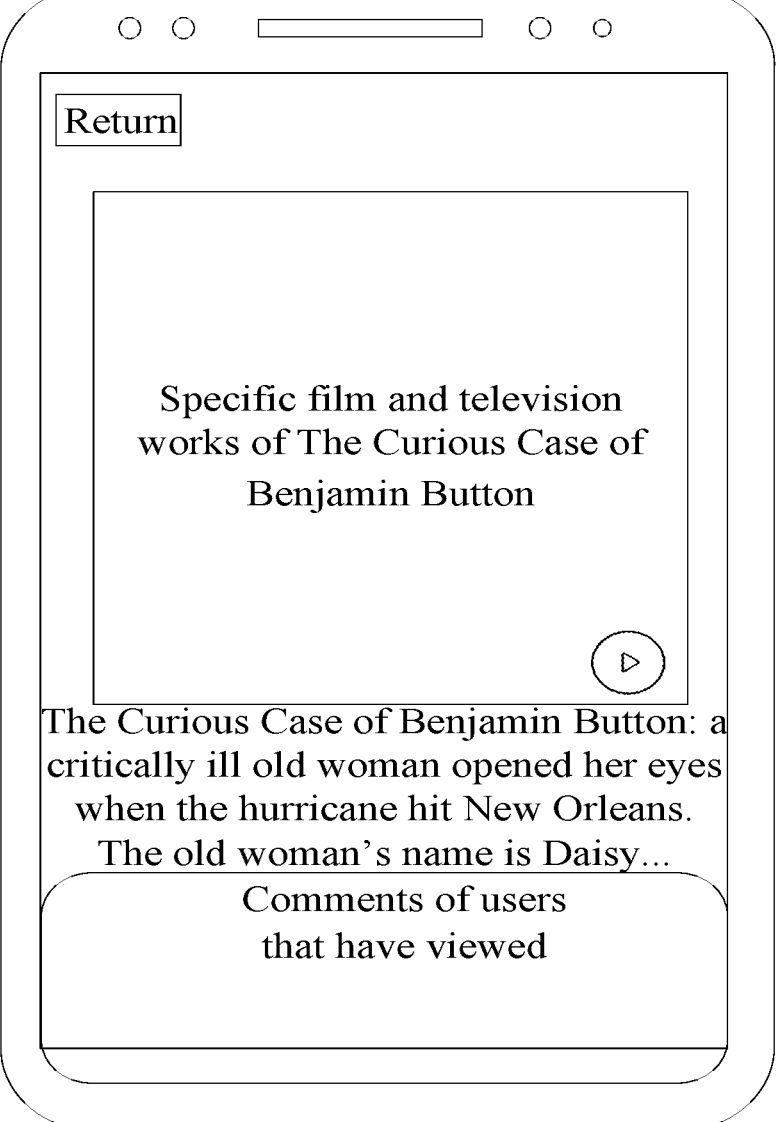
FIG. 7 shows a schematic diagram of a displaying interface of another consumption page corresponding to a target recommended entity provided by an embodiment of the present disclosure.

Exemplarily, after the user initiates the search request corresponding to a plurality of entities, the multi-entity aggregation result is obtained, and the entity name, entity thumbnail and labels of order bit of "Henry&June", "The Curious Case of Benjamin Button", "The Notebook" and "Malena" are displayed sequentially in the first displaying region. When the user selects the identification information of "The Curious Case of Benjamin Button" among the plurality of target entities displayed in the first displaying region, "The Curious Case of Benjamin Button" is taken as the target recommended entity, the associated media contents, such as an article introduction content, a film and television comment content and a highlight content, related to "The Curious Case of Benjamin Button" are displayed in the second displaying region, the encyclopedic knowledge information corresponding to "The Curious Case of Benjamin Button" is displayed in the third displaying region, and the function entry information indicating the user to operate is displayed in the fourth displaying region. After the user clicks the function entry information, it jumps to the consumption page of the film and television work "The Curious Case of Benjamin Button", and the consumption page of "The Curious Case of Benjamin Button" including the entity name: "The Curious Case of Benjamin Button", the entity thumbnail, a purchase prompt of "This film and television content can only be viewed after paying, please purchase", a purchase bottom and a try and view button is displayed on the screen of the user side. The consumption page specifically may be an interface display diagram shown in FIG. 6, taking the user side being the mobile phone; or when the film and television work of "The Curious Case of Benjamin Button" is free to view, after the user clicks the function entry information, it jumps to the details page playing the film and television work of "The Curious Case of Benjamin Button", and the details page of the film and television work of "The Curious Case of Benjamin Button" is displayed on the screen of the user side. The details page of the film and television work of "The Curious Case of Benjamin Button" may include the entity name: "The Curious Case of Benjamin Button", a specific film and television content, introduction of the film and television content, comments of users that have viewed and the like. The consumption page specifically may be an interface display diagram shown in FIG. 7, taking the user side being the mobile phone as an example.

Taking an executive body being a server as an example, the following describes a search result displaying method provided by an embodiment of the present disclosure.

Figure 8:
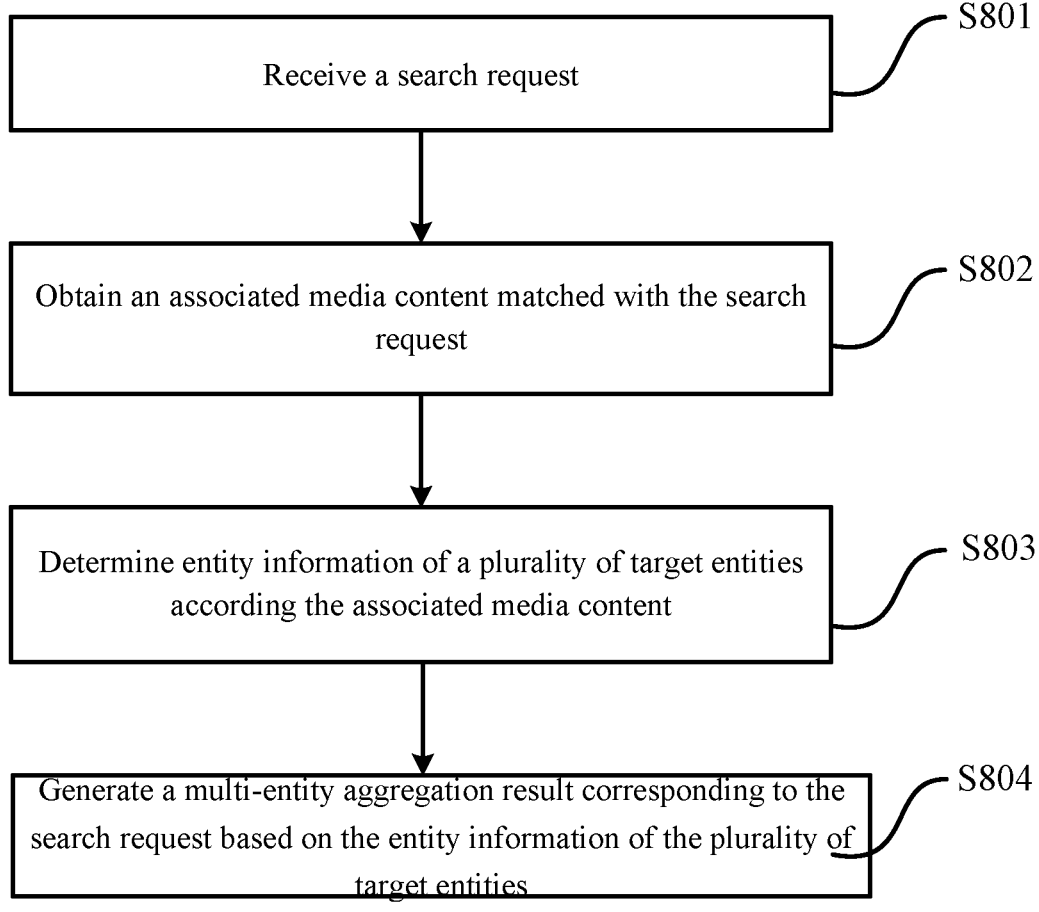
FIG. 8 shows a flow chart of another search result displaying method provided by an embodiment of the present disclosure.

Referring to FIG. 8, which is a flow chart of a search result displaying method provided by an embodiment of the present disclosure, and may be applied to a server, the method includes steps S801-S804:

S801, a search request is received.

The search request corresponds to a plurality of entities.

S802, an associated media content matched with the search request is obtained.

The associated media content may be one or more media contents; and the associated media content may be text documents, image text mixed documents, pictures, videos, audios, etc.

A request type of the search request may include attribute type and entity collection type.

In a possible implementation, if the search request is the attribute type search request, a knowledge map-type content matched with attribute keywords in the search request may be obtained according to the plurality of attribute keywords contained in the search request.

The attribute type search request refers to a search request that uses the plurality of attribute keywords to represent a search intention. For example, when the user inputs a search content as "female stars of the post-90s generation with a height of 170 cm", the plurality of attribute keywords of "post-90s generation", "height", "170 cm" and "female stars" here represent the search intention of the user.

The knowledge map may be a semantic network composed of a plurality of nodes and connecting edges among the nodes. Here, the nodes may represent entities, and information of the nodes is relevant information of corresponding entities, and the connecting edges among the nodes may represent various semantic relations among the entities, such as a parent relation, a conjugal relation, a broker and a friend.

Exemplarily, after the user inputs the search content as "female stars of the post-90s generation with a height of 170 cm" and clicks a "Search" button, the user side sends the search request to the server, and the server receives the search request, determines that the search request type is the attribute type search request, extracts a plurality of attribute keywords contained in the search content corresponding to the search request as "post-90s generation", "height", "170 cm" and "female stars", obtains associated media contents matched with the above gender, age and height attributes in the knowledge map based on the plurality of attribute keywords, and feeds back the found associated media content to the user.

In a specific implementation, the plurality of associated media contents matched with the search request may be determined through the following method, which is described as follows: in a case that a query intention corresponding to the search request is an objective type intention, an associated media content with an objective answer matched with the search request is searched; and in a case that the query intention corresponding to the search request is a subjective type intention, an associated media content with subjective type search results matched with the search request is searched.

Here, the query intention type corresponding to the search request may include an objective type intention and a subjective type intention. For the search request with the objective type intention, the recalled content is the associated media content containing the objective answer, while for the search request with the subjective type intention, the recalled content is the associated media content of the relevant subjective opinion content published. When searching for the associated media contents for these two types of search requests, a standard semantic extraction method may be adopted to obtain standard statements corresponding to the search request, and further search the associated media contents matched with the obtained standard statements.

Specifically, standard statements corresponding to search statements in the search request may be determined based on a pre-trained generalization model; and then the associated media content matched with the search request is obtained based on the standard statements. The generalization model here is trained based on a large number of search statement samples labeled with standard statements, the generalization model may extract keywords from the search statements, and then convert the extracted keywords into the standard statements.

For example, when the user inputs a search content as "what are the four major classical novels" or "what are contained by the four major classical novels" on a search page, the pre-trained generalization model in the server extracts keywords from the above search content that "what are the four major classical novels" or "what are contained by the four major classical novels", extracts a search keyword "four major classical novels" corresponding to the above search content, and forms a standard statement that "what are the four major classical novels".

Specifically, after the server receives the search request of the user, the search content corresponding to the search request is input into the generalization model, the standard statement corresponding to the search request is determined, and a media content library is queried based on the standard statement to determine a plurality of associated media contents corresponding to the search request.

Exemplarily, the user inputs the search content as "what are the four major classical novels", after the user clicks a "Search" button, the server inputs the above search content that "what are the four major classical novels" into the generalization model, determines the standard statement corresponding to the above search content as "what are the four major classical novels", and queries the associated media content matched with the search content in the media content library based on the standard statement.

In a specific implementation, after obtaining the associated media content matched with the search request based on step S802, the entity information of the plurality of target entities matched with the search request may be determined through step S803, as described below.

S803, the entity information of the plurality of target entities is determined according to the associated media content.

Here, the entity information may include identification information of the target entities, target content information associated with the target entities and the like.

The identification information of the target entities may include an entity identification number, an entity name and a thumbnail representing the target entities, and may further include a label of an order bit of the target entity among the plurality of target entities contained in the multi-entity aggregation result. The thumbnail of the entities may be a publicity picture, an introduction picture and the like.

The target content information associated with the target entities may further include: at least one associated media content corresponding to the target entities obtained among the plurality of associated media contents corresponding to the search request, encyclopedic knowledge information and/or recommended information of the target entities, and function entry information corresponding to the target entities. The recommended information may be a text introduction content, a graphic introduction content, a video or audio introduction content, etc. The function entry information may be used for indicating the user to click to enter a details page of the target entity, and the details page may be a specific displaying interface of the target entity, and may also be a purchase page corresponding to the target entity.

Here, the server first performs entity extraction on a plurality of media contents in advance to obtain identification information of a plurality of extracted core entities, and stores a corresponding relation between identification information of each media content and the identification information of the extracted core entities.

The identification information of the core entities may include an entity name, an entity thumbnail, an entity identification number and other information; and the identification information of the media contents may include title information of the media contents, an access address of the media contents and the like.

Here, based on a pre-trained entity extraction model, entity extraction may be performed on the plurality of media contents to obtain the identification information of the plurality of extracted core entities, the entity extraction model is obtained by training a media content sample based on manually labeled identification information of the core entities.

In a specific implementation, according to the identification information of the associated media contents and the corresponding relation between the identification information of stored each associated media content and the identification information of the extracted core entities obtained by step S802, the server searches the identification information of the core entity corresponding to each associated media content; determines attribute information of the searched core entity based on knowledge map information and associated media contents corresponding to the identification information of the core entity; and selects identification information of a target entity from the identification information of the searched core entity based on intention classification information corresponding to the search request and the attribute information of the core entity.

Here, the attribute information of the searched core entity may be determined through the following method, which is described as follows: classification information corresponding to the identification information of the core entity is searched from a knowledge map; and the classification information, the attribute information of the associated media content corresponding to the core entity and the number of occurrences of the core entity in different associated media contents are taken as attribute information of the core entity.

The attribute features of the associated media content include at least one of attribute information of an author, a relevancy between the associated media content and the search request and a sort order of the associated media content in this search.

The knowledge map stores the identification information of each entity and classification information of each entity. The classification information may represent the type of candidate entities, which may include literature, books, films, art, life, transportation, cars, society, brands, food, commodities, science popularization, music, menu, etc.

The attribute information of the author corresponding to the associated media content may include author authority, author influence, etc.; the relevancy between the associated media content and the search request is used for indicating whether the associated media content is consistent with the search requirements of the user, the higher the relevancy, the more consistent the associated media content is with the search requirements of the user; and the order bit of the associated media content in this search may be the order of each associated media content in an obtained search result by searching the search request of the user in a search engine. Here, the higher the order, the more consistent the associated media content is with the search requirements of the user.

Specifically, according to the identification information of the associated media contents and the corresponding relation between the identification information of stored each associated media content and the identification information of the extracted core entities obtained by step S802, the server obtains the identification information of the plurality of core entities; and searches the knowledge map based on the identification information of each core entity to determine the classification information of each core entity, and determines the identification information of the target entity from the above obtained identification information of the plurality of core entities based on the above classification information, the attribute information of the author of the associated media content corresponding to each core entity, the relevancy between the associated media content corresponding to each core entity and the search request, and the order bit of the associated media content corresponding to each core entity in this search.

In a specific implementation, after determining the identification information of the target entity, the encyclopedic knowledge content and/or recommended information in the target content information associated with the target entity may be determined through the following method, which is specifically described as follows: the encyclopedic knowledge content matched with the identification information of the target entity may be obtained based on the identification information of the target entity; and/or, the recommended information corresponding to the target entity is determined based on user behavior data and/or author attribute information of each associated media content corresponding to the target entity.

Here, according to the entity name of the target entity and the entity identification number of the target entity, the encyclopedic knowledge content containing the entity name of the target entity and entity identification number information may be obtained in the media content library.

The user behavior data may include comment contents, search contents and the like of the user after browsing the associated media contents; and the author attribute information may include author identification information, author authority, author influence and the like.

Here, semantic analysis may be performed on the comment contents and the search contents after the user browses the associated media content corresponding to each target entity, the associated media content that the user is interested in is determined, and the associated media content that the user is interested in is taken as the recommended information of the target entity. Based on the author identification information, author authority and author influence of each associated media content corresponding to each target entity, a target author whose author authority is greater than a preset authority threshold and/or author influence is greater than a preset influence threshold may further be determined among authors of each associated media content corresponding to each target entity. In the media content library, the associated media content corresponding to the identification information of the target author is taken as the recommended information of the target entity.

Here, based on the author identification information, author influence and author authority of each associated media content corresponding to each target entity, and the comment contents and search contents after the user browses each associated media content corresponding to each target entity, a target author whose author authority is greater than a preset authority threshold and/or author influence is greater than a preset influence threshold may further be determined among authors of the associated media content corresponding to each target entity. In the media content library, the associated media content that corresponds to the identification information of the target author and the user is interested in is taken as the recommended information of the target entity.

In a specific implementation, after determining the identification information, the encyclopedic knowledge content and/or the recommended information of the target entity, whether the entity information of the target entity contains the function entry information may be determined based on the entity category of the target entity, which is specifically described as follows: when the entity category of the target entity belongs to a target entity category, the entity information of the target entity contains the function entry information; and when the entity category of the target entity does not belong to the target entity category, the entity information of the target entity does not contain the function entry information.

In a specific implementation, after determining the identification information of the plurality of target entities, at least one associated media content corresponding to each target entity, the encyclopedic knowledge content and/or recommended information of each target entity and the function entry information of each target entity based on step S803, a multi-entity aggregation result is generated based on step S804.

S804, based on the entity information of the plurality of target entities, the multi-entity aggregation result corresponding to the search request is generated.

After determining the identification information of the plurality of target entities, at least one associated media content corresponding to each target entity, the encyclopedic knowledge content/recommended information of each target entity and the function entry information of each target entity based on step S803, the entity information of each target entity is aggregated to generate the multi-entity aggregation result corresponding to the search request.

According to the search result displaying method provided by the embodiment of the present disclosure, the server may aggregate the entity information of the plurality of target entities that are consistent with the search request of the user together after receive the search request of the user to generate the multi-entity aggregation result, and send the multi-entity aggregation result to the user side, such that the user side displays the multi-entity aggregation result to the user, the user can display the entity information of the plurality of target entities matched with the search request, the user can intuitively see the entity information of the plurality of target entities through the multi-entity aggregation result, so that the user can conveniently filter the target recommended entity of interest further, the efficiency of information search is improved, and the search time is saved.

Those skilled in the art can understand that in the above method of the specific implementation, the writing order of each step does not mean a strict execution order to constitute any restriction on the implementation process, and the specific execution order of each step should be determined by its function and possible internal logic.

Based on the same inventive concept, an embodiment of the present disclosure further provides a search result displaying apparatus corresponding to the search result displaying method. Since the principle of the apparatus in the embodiment of the present disclosure to solve the problems is similar to the search result displaying method in the embodiment of the present disclosure, the implementation of the apparatus can refer to the implementation of the method, and repetitions will not be made.

Embodiment 3

Figure 9:
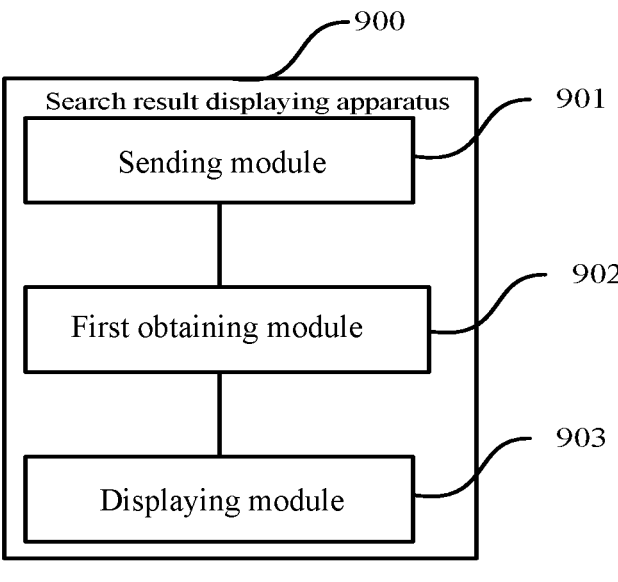
FIG. 9 shows a schematic diagram of a search result displaying apparatus provided by an embodiment of the present disclosure.

Referring to FIG. 9, which is a schematic diagram of a search result displaying apparatus 900 provided by an embodiment of the present disclosure, the apparatus includes: a sending module 901, a first obtaining module 902 and a displaying module 903.

The sending module 901 is configured to send a search request in response to a search triggering instruction, and the search request corresponds to a plurality of entities.

The first obtaining module 902 is configured to obtain a multi-entity aggregation result corresponding to the search request, the multi-entity aggregation result includes entity information of a plurality of target entities matched with the search request, and the entity information is obtained based on an associated media content corresponding to the search request.

The displaying module 903 is configured to display the multi-entity aggregation result.

In the embodiment of the present disclosure, after the user initiates the search request at the user side, the multi-entity aggregation result corresponding to the search request can be obtained, the multi-entity aggregation result contains the entity information of the plurality of target entities, and the entity information of the plurality of target entities is obtained based on the associated media contents corresponding to the search request. In this way, the user side can intuitively display the entity information of the plurality of target entities matched with the search request to the user, the user can conveniently see the entity information of the target entity of interest, the efficiency of information search is improved, and the search time is saved.

In a possible implementation, the entity information includes identification information of the target entities and target content information associated with the target entities; and the target content information associated with the target entities contains: at least one associated media content corresponding to the target entities among a plurality of associated media contents corresponding to the search request.

In a possible implementation, the displaying module 903 is specifically configured to display the identification information of the plurality of target entities in a first displaying region; determine a target recommended entity corresponding to selected target identification information among the identification information of the plurality of target entities; and display content information associated with the target recommended entity in other displaying regions.

In a possible implementation, the displaying module 903 is further specifically configured to display the identification information of the plurality of target entities sequentially in the first displaying region according to the obtained identification information of the plurality of target entities.

In a possible implementation, the displaying module 903 is further specifically configured to display the at least one associated media content corresponding to the target recommended entity sequentially in a second displaying region.

In a possible implementation, the displaying module 903 is further specifically configured to take, after obtaining the multi-entity aggregation result, a target entity displayed in a first displaying position of the first displaying region as an initial target recommended entity; and take, if a selection operation for identification information of other target entities displayed in other displaying positions of the first displaying region is detected, the other target entities as updated target recommended entities.

In a possible implementation, the target content information associated with the target entities further contains: encyclopedic knowledge information and/or recommendation information of the target entities.

In a possible implementation, the displaying module 903 is further specifically configured to display the encyclopedic knowledge information and/or the recommendation information of a target recommended entity in a third displaying region.

In a possible implementation, the target content information associated with the target entities further contains: function entry information of the target recommended entity, and the function entry information is used for triggering to display a consumption page corresponding to the target recommended entity.

In a possible implementation, the displaying module 903 is specifically further configured to display the function entry information of the target recommended entity in a fourth displaying region, and after detecting a trigger operation for the function entry information, a consumption page corresponding to the target recommended entity is displayed.

In a possible implementation, the displaying module 903 is further specifically configured to display, in a case that an entity category of the target recommended entity belongs to a target entity category, the function entry information of the target recommended entity in the fourth displaying region.

Embodiment 4

Figure 10:
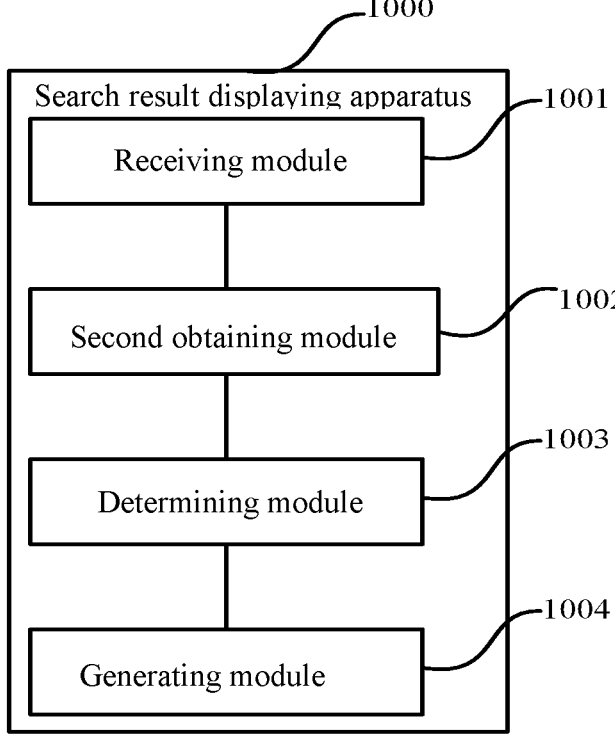
FIG. 10 shows a schematic diagram of another search result displaying apparatus provided by an embodiment of the present disclosure.

Referring to FIG. 10, which is a schematic diagram of another search result displaying apparatus 1000 provided by an embodiment of the present disclosure, the apparatus includes: a receiving module 1001, a second obtaining module 1002, a determining module 1003 and a generating module 1004.

The receiving module 1001 is configured to receive a search request, and the search request corresponds to a plurality of entities.

The second obtaining module 1002 is configured to obtain an associated media content matched with the search request.

The determining module 1003 is configured to determine entity information of a plurality of target entities according to the associated media content.

The generating module 1004 is configured to generate, based on the entity information of the plurality of target entities, a multi-entity aggregation result corresponding to the search request.

In a possible implementation, the entity information includes identification information of the target entities and target content information associated with the target entities; and the target content information associated with the target entities contains: at least one associated media content corresponding to the target entities among a plurality of associated media contents corresponding to the search request.

In the embodiment of the present disclosure, the server may aggregate the entity information of the plurality of target entities that are consistent with the search request of the user together after receive the search request of the user to generate the multi-entity aggregation result, and send the multi-entity aggregation result to the user side, such that the user side displays the multi-entity aggregation result to the user, the user can display the entity information of the plurality of target entities matched with the search request, the user can intuitively see the entity information of the plurality of target entities through the multi-entity aggregation result, so that the user can conveniently filter the target recommended entity of interest further, the efficiency of information search is improved, and the search time is saved.

In a possible implementation, the apparatus further includes an entity extraction module, configured to perform entity extraction on a plurality of media contents in advance to obtain identification information of a plurality of extracted core entities, and store a corresponding relation between identification information of each media content and the identification information of the extracted core entities.

The determining module 1003 is specifically configured to determine the entity information of the target entities according to the identification information of the associated media content and the stored corresponding relation.

In a possible implementation, the determining module 1003 is specifically further configured to search the identification information of the core entity corresponding to each associated media content according to the identification information of the associated media contents and the stored corresponding relation; determine attribute information of the searched core entity based on knowledge map information and associated media contents corresponding to the identification information of the core entity; and select identification information of a target entity from the identification information of the searched core entity based on intention classification information corresponding to the search request and the attribute information of the core entity.

In a possible implementation, the determining module 1003 is specifically further configured to search classification information corresponding to the identification information of the core entity from a knowledge map; and take the classification information, attribute features of the associated media content corresponding to the core entity and the number of occurrences of the core entity in different associated media contents as attribute information of the core entity. The attribute features of the associated media content include at least one of attribute information of an author, a relevancy between the associated media content and the search request and a sort order of the associated media content in this search.

In a possible implementation, the entity extraction module is specifically configured to perform, based on a pre-trained entity extraction model, entity extraction on the plurality of media contents to obtain the identification information of the plurality of extracted core entities, the entity extraction model being obtained by training a media content sample based on manually labeled identification information of the core entities.

In a possible implementation, if the search request is an attribute type search request, the attribute type search request refers to a search request that uses the plurality of attribute keywords to represent a search intention.

The second obtaining module 1002 is specifically configured to obtain a knowledge map-type content matched with the attribute keywords in the search request.

The determining module 1003 is specifically further configured to extract the identification information of the target entities and the content information associated with the target entities used for being displayed in the multi-entity aggregation result from the knowledge map-type content matched with the attribute keywords in the search request.

In a possible implementation, the target content information associated with the target entities further includes an encyclopedic knowledge content and/or recommended information; and the apparatus further includes a target content information determining module, configured to obtain the encyclopedic knowledge content matched with the identification information of the target entities based on the identification information of the target entities, and/or, determine the recommended information corresponding to the target entities based on user behavior data and/or author attribute information of each associated media content corresponding to the target entities.

The description of the processing flow of each module and the interaction flow among the modules in the apparatus can refer to the relevant description in the above method embodiments, which will not be detailed here.

Figure 11:
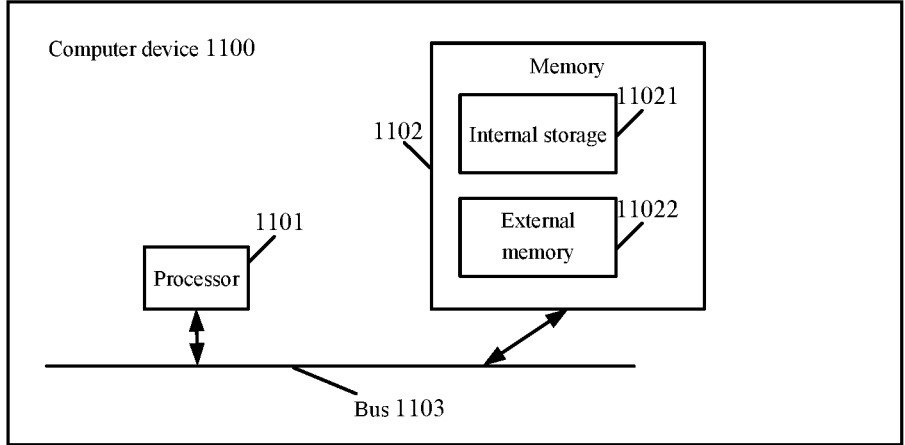
FIG. 11 shows a schematic diagram of a computer device provided by an embodiment of the present disclosure.

Based on the same inventive concept, an embodiment of the present application further provides a computer device. Referring to FIG. 11, which is a schematic structural diagram of a computer device 1100 provided by an embodiment of the present application. The computer device includes a processor 1101, a memory 1102 and a bus 1103. The memory 1102 is configured to store execution instructions, including an internal storage 11021 and an external memory 11022. The internal storage 11021 is also called an internal memory, configured to temporarily store operation data in the processor 1101 and data exchanged with the external memory 11022 such as a hard disk, and the processor 1101 exchanges data with the external memory 11022 through the internal storage 11021. When the computer device 1100 is running, the processor 1101 is in communication with the memory 1102 through the bus 1103, such that the processor 1101 executes the following instructions:

sending a search request in response to a search triggering instruction, and the search request corresponding to a plurality of entities; obtaining a multi-entity aggregation result corresponding to the search request, the multi-entity aggregation result including entity information of a plurality of target entities matched with the search request, and the entity information being obtained based on an associated media content corresponding to the search request; and displaying the multi-entity aggregation result.

Figure 12:
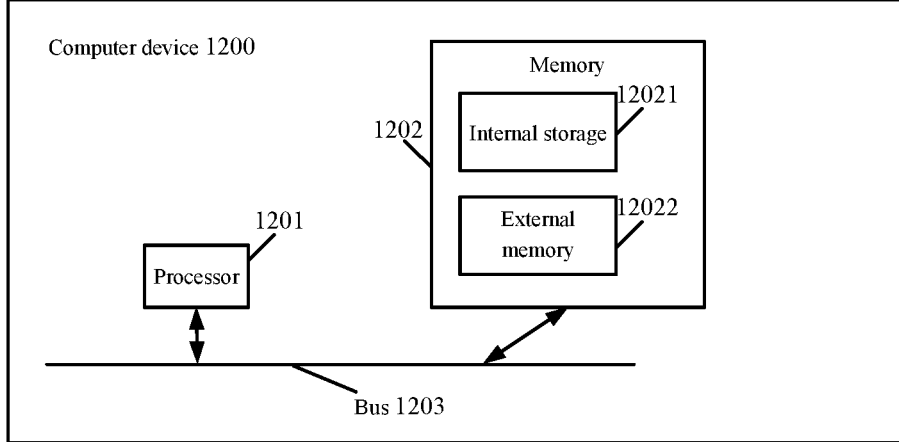
FIG. 12 shows a schematic diagram of another computer device provided by an embodiment of the present disclosure.

Based on the same inventive concept, an embodiment of the present application further provides a computer device. Referring to FIG. 12, which is a schematic structural diagram of a computer device 1200 provided by an embodiment of the present application. The computer device includes a processor 1201, a memory 1202 and a bus 1203. The memory 1202 is configured to store execution instructions, including an internal storage 12021 and an external memory 12022. The internal storage 12021 is also called an internal memory, configured to temporarily store operation data in the processor 1201 and data exchanged with the external memory 12022 such as a hard disk, and the processor 1201 exchanges data with the external memory 12022 through the internal storage 12021. When the computer device 1200 is running, the processor 1201 is in communication with the memory 1202 through the bus 1203, such that the processor 1201 executes the following instructions:

receiving a search request, and the search request corresponding to a plurality of entities; obtaining an associated media content matched with the search request; determining entity information of a plurality of target entities according to the associated media content; and generating a multi-entity aggregation result corresponding to the search request based on the entity information of the plurality of target entities.

The embodiments of the present disclosure also provide a computer-readable storage medium in which a computer program is stored. When the computer program is run by a processor, the steps of the method of displaying the search results described in the above method embodiments are implemented. The storage medium can be a volatile or non-volatile computer readable storage medium.

The computer program product of the search result displaying method provided by the embodiments of the present disclosure includes a computer-readable storage medium that stores program code. The instructions included in the program code can be used to implement the steps of the search result displaying method described in the above method embodiments. See the above method embodiments for details, and will not be repeated here.

The embodiments of the present disclosure also provide a computer program, which is executed by a processor to implement any of the above embodiments. The computer program product can be realized by hardware, software or their combination. In one optional embodiment, the computer program product is specifically embodied as a computer storage medium, and in another optional embodiment, the computer program product is specifically embodied as a software product, such as a software development kit (SDK), etc.

Those skilled in the art can clearly understand that, for the convenience and simplicity of description, the specific working process of the above described systems and devices can refer to the corresponding process in the above method embodiments, and will not be repeated here. In several embodiments provided in the present disclosure, it should be understood that the disclosed system, device and method can be implemented in other ways. The device embodiments described above are only schematic, for example, the division of the unit is only a logical function division, and there can be another division method when it is actually implemented. For example, multiple units or components can be combined or integrated into another system, or some features can be ignored or not implemented. On the other hand, the mutual coupling or direct coupling or communication connection shown or discussed can be indirect coupling or communication connection through some communication interfaces, devices or units, and can be electrical, mechanical or other forms.

The units described as separate units may or may not be physically separated, and the features displayed as units may or may not be physical units, that is, they may be located in one place or distributed to multiple network units. Some or all of the units can be selected according to actual needs to achieve the purpose of the embodiment.

In addition, each functional unit in each embodiment of the present disclosure can be integrated in a processing unit, or each unit can exist physically independently, or two or more units can be integrated in a unit.

If the function is implemented in the form of a software functional unit and sold or used as an independent product, it can be stored in a nonvolatile computer readable storage medium that can be executed by a processor. Based on this understanding, the technical solution of the present disclosure can be embodied in the form of a software product, which is stored in a storage medium, A number of instructions are included to enable a computer device (which may be a personal computer, a server, or a network device, etc.)

to perform all or part of the steps of the method described in various embodiments of the present disclosure. The aforementioned storage media include: USB flash disk, mobile hard disk, read only memory (ROM), random access memory (RAM), magnetic disc or optical disc and other media that can store program codes.

Finally, it should be noted that the above embodiments are only specific embodiments of the disclosure to illustrate the technical solution of the disclosure, rather than limit it. The scope of protection of the disclosure is not limited to this. Although the disclosure has been described in detail with reference to the aforementioned embodiments, ordinary technicians in the art should understand that: in the scope of the disclosure, any skilled person familiar with the technical field can still modify or easily think of changes to the technical solutions recorded in the aforementioned embodiments, or equivalently replace some of the technical features; However, these modifications, changes or substitutions do not make the nature of the corresponding technical solutions deviate from the spirit and scope of the technical solutions of the embodiments of the present disclosure, and should be covered in the scope of protection of the present disclosure. Therefore, the scope of protection of this disclosure shall be subject to the scope of protection claimed.

What is claimed is:

1. A method implemented by a computing device for searching content and displaying a search result, comprising:

sending, by the computing device, a search request to a server in response to a search triggering instruction;

obtaining, by the computing device, a multi-entity aggregation result as the search result corresponding to the search request from the server, wherein the multi-entity aggregation result comprises entity information of a plurality of target entities, wherein the plurality of target entities is determined by the server based on determining associated media content matched with the search request, and wherein the plurality of target entities comprise a plurality of film and television works;

displaying identifiers of the plurality of film and television works in a first region of a same interface on the computing device, wherein the same interface is configured to display the search result;

in response to selecting one of the identifiers in the first region of the same interface, displaying review content and video content associated with one of the plurality of film and television works in a second region of the same interface on the computing device, wherein the one of the plurality of film and television works corresponds to the selected identifier, and wherein the second region of the same interface is separate and different from the first region of the same interface;

in response to selecting the one of the identifiers in the first region of the same interface, displaying encyclopedic knowledge information associated with the one of the plurality of film and television works in a third region of the same interface on the computing device, wherein the third region of the same interface is separate and different from the first region of the same interface and the second region of the same interface;

displaying function entry information of the one of the plurality of film and television works in a fourth region of the same interface in response to selecting the one of the identifiers in the first region of the same interface, wherein the function entry information is configured to enter a consumption page of the one of the plurality of film and television works;

in response to selecting the review content or the video content in the second region of the same interface, jumping to a detail page of the review content or the video content; and in response to selecting the function entry information in the fourth region of the same interface, jumping to a consumption page of the one of the plurality of film and television works, wherein the consumption page comprises an interface element configured to purchase the one of the plurality of film and television works.

2. The method according to claim 1, wherein displaying the identifiers of the plurality of film and television works in a first region of an interface comprises:

displaying the identifiers of the plurality of film and television works sequentially in the first region.

3. The method according to claim 1, wherein the method further comprises:

displaying recommendation information of the one of the plurality of film and television works in the third region of the interface.

4. The method according to claim 1, further comprising:

displaying an entry control associated with the one of the plurality of film and television works in a fourth region of the interface on the computing device, wherein the entry control is configured to trigger display of a consumption page corresponding to the one of the plurality of film and television works.

5. The method according to claim 4, further comprising:

displaying the consumption page corresponding to the one of the plurality of film and television works in response to detecting a trigger operation performed on the entry control.

6. The method according to claim 4, wherein displaying the entry control associated with the one of the plurality of film and television works in a fourth region of the interface on the computing device comprises:

in response to determining that an entity category of the one of the plurality of film and television works belongs to a target entity category, displaying the entry control associated with the one of the plurality of film and television works in the fourth region.

7. A computing device, comprising: a processor, a memory and a bus, wherein the memory stores machine-readable instructions that can be executed by the processor, when the computing device is running, the processor is in communication with the memory through the bus, and the machine-readable instructions, when executed by the processor, cause the processor to implement operations comprising:

sending, by the computing device, a search request to a server in response to a search triggering instruction;

obtaining, by the computing device, a multi-entity aggregation result as a search result corresponding to the search request from the server, wherein the multi-entity aggregation result comprises entity information of a plurality of target entities, wherein the plurality of target entities is determined by the server based on determining associated media content matched with the search request, and wherein the plurality of target entities comprise a plurality of film and television works;

displaying identifiers of the plurality of film and television works in a first region of a same interface on the computing device, wherein the same interface is configured to display the search result;

in response to selecting one of the identifiers in the first region of the same interface, displaying review content and video content associated with one of the plurality of film and television works in a second region of the same interface on the computing device, wherein the one of the plurality of film and television works corresponds to the selected identifier, and wherein the second region of the same interface is separate and different from the first region of the same interface;

in response to selecting the one of the identifiers in the first region of the same interface, displaying encyclopedic knowledge information associated with the one of the plurality of film and television works in a third region of the same interface on the computing device, wherein the third region of the same interface is separate and different from the first region of the same interface and the second region of the same interface;

displaying function entry information of the one of the plurality of film and television works in a fourth region of the same interface in response to selecting the one of the identifiers in the first region of the same interface, wherein the function entry information is configured to enter a consumption page of the one of the plurality of film and television works:

in response to selecting the review content or the video content in the second region of the same interface, jumping to a detail page of the review content or the video content; and in response to selecting the function entry information in the fourth region of the same interface, jumping to a consumption page of the one of the plurality of film and television works, wherein the consumption page comprises an interface element configured to purchase the one of the plurality of film and television works.

8. The computing device according to claim 7, wherein displaying the identifiers of the plurality of film and television works in the first region of the interface comprises:

displaying the identifiers of the plurality of film and television works sequentially in the first region.

9. The computing device according to claim 7, wherein the operations further comprise:

displaying recommendation information of the one of the plurality of film and television works in the third region of the interface.

10. The computing device according to claim 7, the operations further comprising:

displaying an entry control associated with the one of the plurality of film and television works in a fourth region of the interface on the computing device, wherein the entry control is configured to trigger display of a consumption page corresponding to the one of the plurality of film and television works.

11. The computing device according to claim 10, the operations further comprising:

displaying the consumption page corresponding to the one of the plurality of film and television works in response to detecting a trigger operation performed on the entry control.

12. The computing device according to claim 10, the operations further comprising:

displaying the entry control associated with the one of the plurality of film and television works in the fourth region in response to determining that an entity category of the one of the plurality of film and television works belongs to a target entity category.

13. A non-transitory computer-readable storage medium, storing computer programs therein, wherein the computer programs, when executed by a computing device, cause the computing device to implement operations comprising:

sending, by the computing device, a search request to a server in response to a search triggering instruction;

obtaining, by the computing device, a multi-entity aggregation result as a search result corresponding to the search request from the server, wherein the multi-entity aggregation result comprises entity information of a plurality of target entities, wherein the plurality of target entities is determined by the server based on determining associated media content matched with the search request, and wherein the plurality of target entities comprise a plurality of film and television works;

displaying identifiers of the plurality of film and television works in a first region of a same interface on the computing device, wherein the same interface is configured to display the search result;

in response to selecting one of the identifiers in the first region of the same interface, displaying review content and video content associated with one of the plurality of film and television works in a second region of the same interface on the computing device, wherein the one of the plurality of film and television works corresponds to the selected identifier, and wherein the second region of the same interface is separate and different from the first region of the same interface;

in response to selecting the one of the identifiers in the first region of the same interface, displaying encyclopedic knowledge information associated with the one of the plurality of film and television works in a third region of the same interface on the computing device, wherein the third region of the same interface is separate and different from the first region of the same interface and the second region of the same interface;

displaying function entry information of the one of the plurality of film and television works in a fourth region of the same interface in response to selecting the one of the identifiers in the first region of the same interface, wherein the function entry information is configured to enter a consumption page of the one of the plurality of film and television works:

in response to selecting the review content or the video content in the second region of the same interface, jumping to a detail page of the review content or the video content; and in response to selecting the function entry information in the fourth region of the same interface, jumping to a consumption page of the one of the plurality of film and television works, wherein the consumption page comprises an interface element configured to purchase the one of the plurality of film and television works.

14. The non-transitory computer-readable storage medium according to claim 13, wherein displaying the identifiers of the plurality of film and television works in a first region of an interface comprises:

displaying the identifiers of the plurality of film and television works sequentially in the first region.

15. The non-transitory computer-readable storage medium according to claim 13, wherein the operations further comprise:

displaying recommendation information of the one of the plurality of film and television works in the third region of the interface.

16. The non-transitory computer-readable storage medium according to claim 13, the operations further comprising:

displaying an entry control associated with the one of the plurality of film and television works in a fourth region of the interface on the computing device, wherein the entry control is configured to trigger display of a consumption page corresponding to the one of the plurality of film and television works.

17. The non-transitory computer-readable storage medium according to claim 16, the operations further comprising:

displaying the consumption page corresponding to the one of the plurality of film and television works in response to detecting a trigger operation performed on the entry control.

* * * * *